Feb. 6, 1934.  O. DE W. SCRUGGS, JR  1,945,755
DOUGH HANDLING MACHINE
Filed Oct. 21, 1932  4 Sheets-Sheet 1
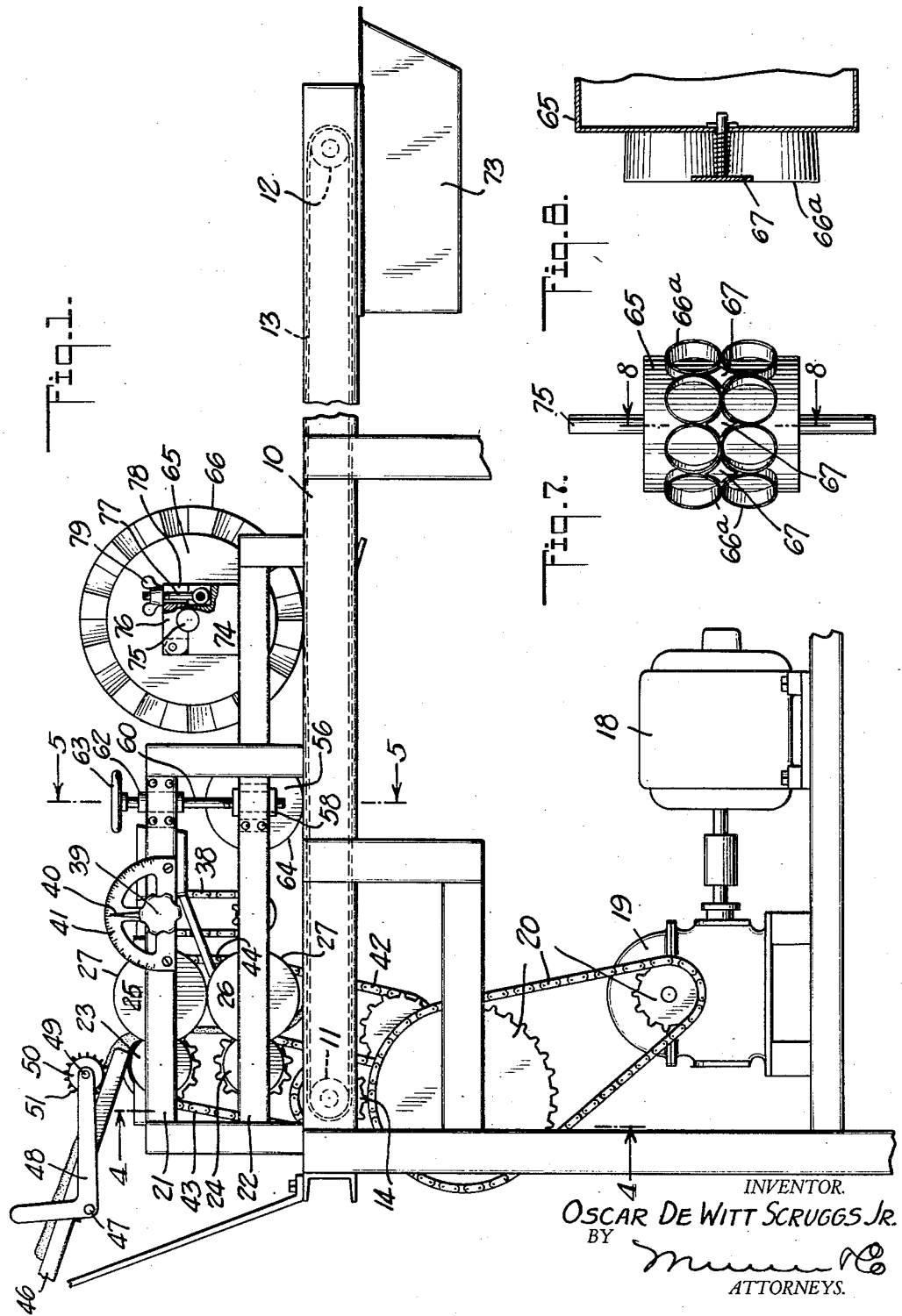
INVENTOR.
OSCAR DE WITT SCRUGGS JR.
BY
ATTORNEYS.

Feb. 6, 1934.    O. DE W. SCRUGGS, JR    1,945,755
DOUGH HANDLING MACHINE
Filed Oct. 21, 1932    4 Sheets-Sheet 2
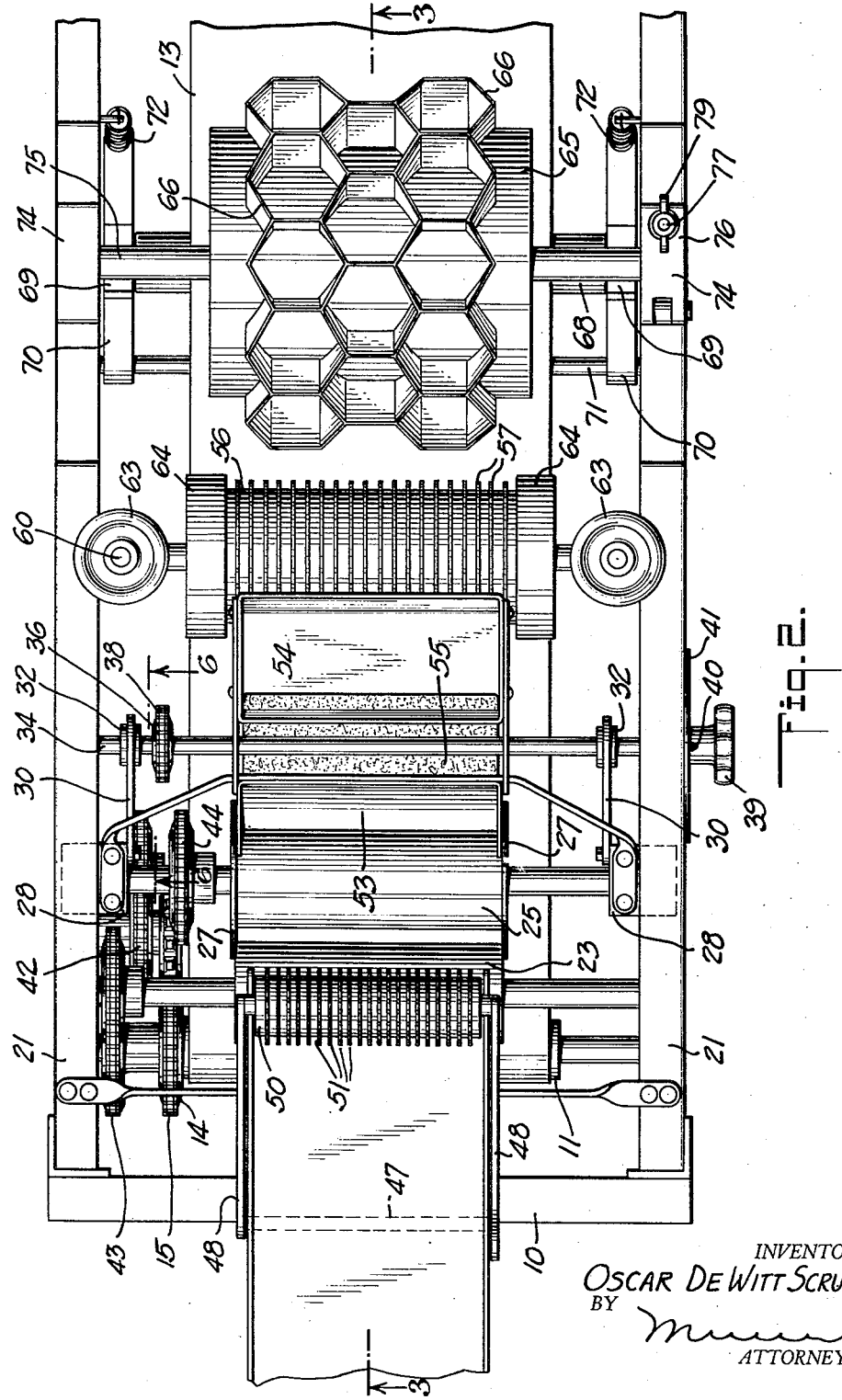
INVENTOR.
OSCAR DE WITT SCRUGGS JR
BY
ATTORNEYS.

Feb. 6, 1934.  O. DE W. SCRUGGS, JR  1,945,755
DOUGH HANDLING MACHINE
Filed Oct. 21, 1932  4 Sheets-Sheet 3
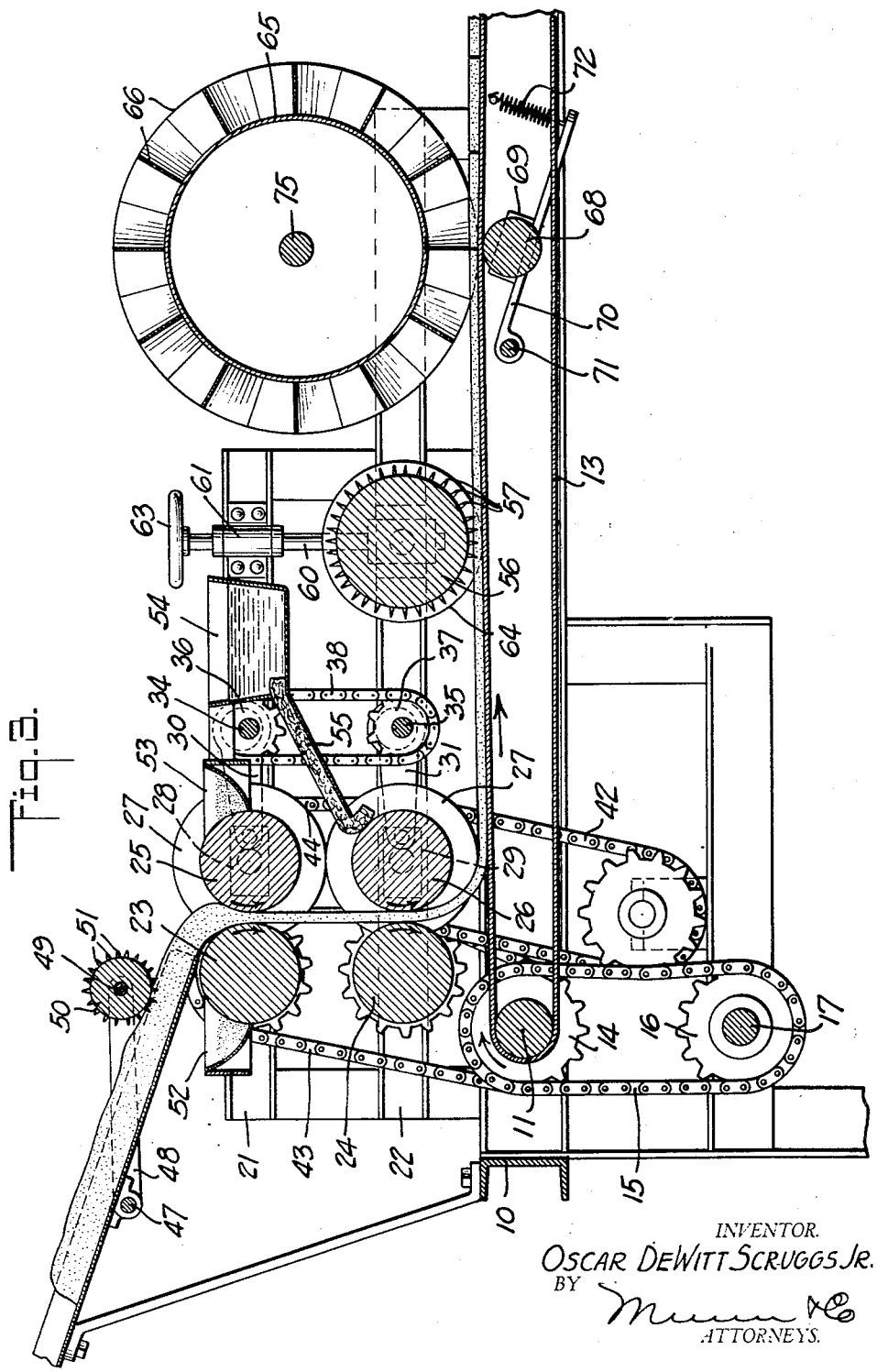
INVENTOR.
OSCAR DEWITT SCRUGGS JR.
BY
ATTORNEYS.

Feb. 6, 1934.    O. DE W. SCRUGGS, JR    1,945,755
DOUGH HANDLING MACHINE
Filed Oct. 21, 1932    4 Sheets-Sheet 4
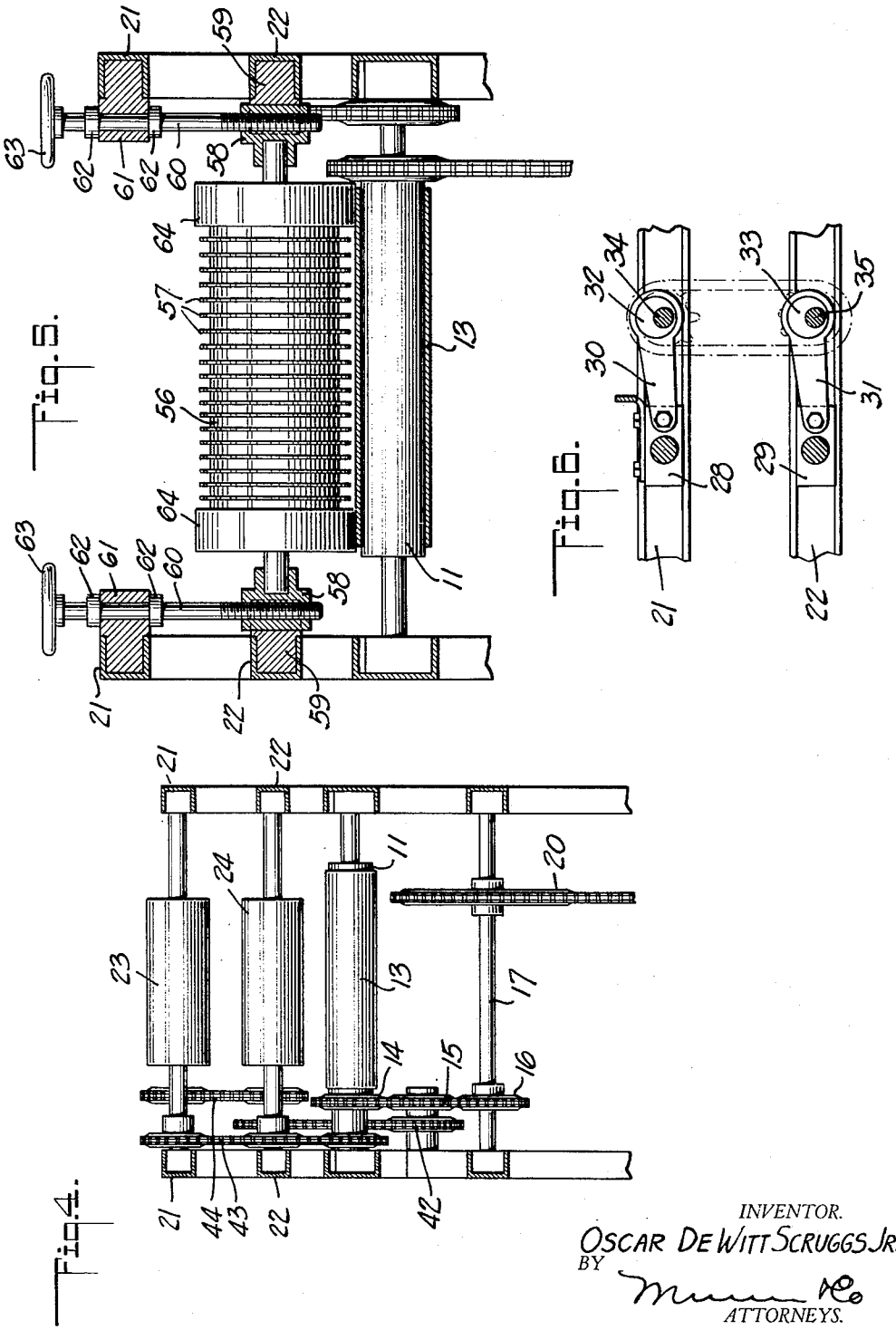
INVENTOR.
OSCAR DE WITT SCRUGGS JR.
BY
ATTORNEYS.

UNITED STATES PATENT OFFICE

1,945,755
DOUGH HANDLING MACHINE
Oscar De Witt Scruggs, Jr., Chattanooga, Tenn.

Application October 21, 1932. Serial No. 638,958

5 Claims. (Cl. 107—23)

This invention relates to and has for a purpose the provision of a machine by which a mass or body of dough can be formed into a sheet and the sheet divided into sections of various shapes to produce biscuits, rolls, buns, cookies and other products when baked.

It is a further purpose of the invention to provide a machine of the above described character which embodies means for puncturing the dough sheet prior to its delivery to a dividing means, in a manner to evacuate air from, and prevent natural shrinkage of the live dough, so that when the sheet is divided into sections, the latter will maintain the size intended for baking.

It is another purpose of the invention to provide a dough handling machine in which the sheeting, puncturing and dividing operations are successively performed automatically in a continuous process.

Only one form of the invention will be described following which its novel features will be pointed out in claims.

In the accompanying drawings:

Figure 1 is a view showing in side elevation one form of dough handling machine embodying this invention;

Figure 2 is an enlarged fragmentary plan view of the machine;

Figure 3 is a vertical longitudinal sectional view taken on the line 3—3 of Figure 2 and looking in the direction of the arrows;

Figure 4 is a vertical transverse sectional view taken on the line 4—4 of Figure 1;

Figure 5 is an enlarged vertical transverse sectional view taken on the line 5—5 of Figure 1;

Figure 6 is a fragmentary sectional view taken on the line 6—6 of Figure 2;

Figure 7 is a view in side elevation of one of a number of dough sheet dividing elements which are selectively associated with the machine;

Figure 8 is an enlarged fragmentary sectional view taken on the line 8—8 of Figure 7.

Referring specifically to the drawings, wherein similar reference characters designate similar parts in each of the several views, this invention in its present embodiment comprises a main frame 10 of rectangular form at the ends of which are journaled rollers 11 and 12, having trained thereabout an endless belt 13 providing a conveyor for a sheet of dough. Fixed to the roller 11 is a sprocket wheel 14 about which is trained a chain 15 also trained about a second sprocket wheel 16 fixed to a countershaft 17 journaled in the frame 10. An electric motor 18 is supported on the frame 10 and drives the shaft 17 through the medium of a suitable reducing gearing 19 and a chain and sprocket connection 20 between the gearing and shaft 17 as shown in Figure 1, to the end of driving the belt 13 so that its upper stretch travels to the right or in the direction of the arrow in Figure 3.

Supported on the frame 10 is a superstructure including pairs of upper and lower longitudinal members 21 and 22 respectively. Journaled directly one above the other in the members 21 and 22 are horizontally disposed rollers 23 and 24. Directly opposite these rollers horizontally, are mating rollers 25 and 26 having flanges 27 at their ends which overlap the ends of the rollers 23 and 24 to confine dough against spreading beyond the ends of the rollers as will be understood.

The rollers 25 and 26 are journaled respectively in bearings 28 and 29 slidably mounted in the longitudinal members 21 and 22 respectively. To the bearings 28 and 29 are pivotally connected eccentric straps 30 and 31, respectively, mounted on eccentrics 32 and 33 fixed to shafts 34 and 35 journaled respectively in the longitudinal members 21 and 22. Also fixed to the shafts 34 and 35 are sprocket wheels 36 and 37 about which is trained a chain 38 for driving the shafts in unison. Fixed to the shaft 34 exteriorly of one of the longitudinal members 21 is a knob 39 having a pointer 40 adapted to traverse the graduations of a dial 41 fixed to said member 21, as shown in Figure 1. It will be clear that as the knob is turned, the eccentrics 32 and 33 will cause the rollers 25 and 26 to be adjusted correspondingly toward or away from the coacting rollers 23 and 24 to vary the spacing between the former and latter rollers, and hence vary the thickness of dough sheet formed from a body of dough by the rollers. It is to be noted that the spacing of the roller 26 from the roller 24 is slightly less than the spacing of the roller 25 from the roller 23 so that the rolling of the dough into a sheet of a final predetermined thickness is accomplished in two operations, in order to evacuate as much air as possible from the dough.

The several rollers 23, 24 and 25 and 26 are positively driven from the motor 18 in the directions indicated by the respective arrows in Figure 3, by suitable chain and sprocket connections 42, 43 and 44 shown in Figures 3 and 4, so that the dough will be drawn downwardly by and between the upper and lower pairs of rollers and the resulting dough sheet deposited onto the upper stretch of the belt 13 so as to be fed along with the belt.

The body of dough is delivered to the upper rollers 23 and 25 from an inclined chute 46 supported from the frame 10 and having journaled thereunder a rocker shaft 47 to the ends of which are fixed arms 48 connected at their free ends by a shaft 49 on which is rotatably mounted a weighted roller 50 having circular series of teeth 51 at intervals along its length. With a body of dough supplied to the chute, and with the roller 50 resting on the dough body, the roller will retard the downward movement of the dough in the chute, sufficiently to prevent the dough from overfeeding as the rollers 23 and 25 draw the dough therebetween.

Suitable flour trays 52 and 53 can be provided at the rollers 23 and 25 as shown in Figures 2 and 3 to coat opposite sides of the dough sheet with flour; and a reservoir 54 for cooking oil can also be included for supplying a film of oil to the roller 26 by means of a wick 55 leading from the reservoir and having wiping contact with the roller 26. The oil is transferred from the roller 26 to the one side of the dough sheet.

The flour tray 52 is rigidly supported from the members 21, whereas the flour tray 53 is supported from the bearings 28—28, all as shown in Figure 2. The reservoir 54 is detachably mounted on the tray 53 so as to be readily removable when its use is not required.

As the dough sheet is fed along on the upper stretch of the belt 13, it is successively punctured and divided into sections. For the puncturing operation, a roller 56 having circular series of teeth 57 at intervals along its length, is journaled in bearings 58—58 (Figure 5) slidably mounted vertically in brackets 59—59 secured to the longitudinal members 22. Feed screws 60—60 are threaded through these bearings and are rotatably mounted in other bearings 61—61 secured to the longitudinal members 21. Collars 62 are secured to the screws above and below the bearings 61 so as to prevent axial displacement of the screws as they are turned by handles 63, to the end that the screws will coact with the lower bearings 58 to adjust the roller 56 vertically with respect to the belt.

The end portions of the roller 56 are enlarged as indicated at 64—64 and engage the belt so as to frictionally drive the roller and maintain its teeth 57 out of actual contact with the belt so as to prevent damage to the latter. The teeth are in close proximity to the belt when the portions 64 of the roller engage the belt, so that the teeth will effectively function to puncture the dough sheet and evacuate air therefrom as well as eliminate the natural tendency of the live dough to shrink. The vertical adjustability of the puncturing roller enables it to be elevated a sufficient amount to be inactive when it is desired that the sheet remain unpunctured.

Following its passage beneath the roller 56, the dough sheet is delivered to a dividing element in the form of a cylinder 65 having on its periphery circumferential and axial series of blunt edged cutters 66, the plan contour of which vary in accordance with the shapes of the sections into which it is desired to divide the dough sheet. The cutters 66 shown in Figures 1, 2 and 3 are of hexagonal shape and interfit so as to produce correspondingly shaped sections from the dough sheet; whereas the cutters 66a shown in Figures 7 and 8 are circular in contour. With the circular shapes of cutters or those in which scraps of dough will remain between adjacent cutters, spring pressed ejectors 67 are mounted in the spaces between such cutters as shown in Figures 7 and 8. The ejectors function automatically to strip the scraps from the cutters as the divided dough sheet leaves the latter.

As the cutters 66 are blunt edged, so as not to damage the belt 13, the cutting action is obtained by a pressure roller 68 disposed immediately below the dividing element and between the stretches of the belt 13 as shown in Figure 3. This roller is journaled in bearings 69 fixed to arms 70 pivoted on a rod 71 secured at its ends to the frame 10. Springs 72 connected to the frame and to the free ends of the arms urge the roller into engagement with the upper stretch of the belt so as to yieldingly maintain the latter in engagement with the cutting edges of the cutters, thus insuring that the cutters will shear through the dough sheet as the dividing element is rotated by the traveling belt. The sections into which the sheet is divided are removed from the belt and placed into suitable pans, leaving any scraps on the belt to gravitate into a pan 73 supported from the frame beneath the remote end of the belt at the roller 12, as shown in Figure 1.

The dividing element is rendered removable from the machine by having one of the bearings 74—74 in which its shaft 75 is journaled, split as shown in Figure 1, to provide a hinged upper section 76 which can be clamped to confine the shaft, by means of a screw 77 pivoted on the lower section of the bearing and entering a slot 78 in the upper section, a wing nut 79 being threaded on this bolt to engage the upper section, all as shown in Figure 1. This arrangement permits any one of several dividing elements having various forms of cutters to be selectively applied to the machine in accordance with the particular shapes of sections into which the dough sheet is to be divided.

It will be manifest that as the dough sheet is punctured prior to its delivery to the dividing element, that the resulting sections of dough will be practically free from shrinkage so as to maintain the original size of the sections for baking.

I claim:

1. A dough handling machine comprising means for conveying a sheet of dough along a predetermined path; a rotary puncturing element having peripheral series of teeth for puncturing the dough sheet as it is being fed by the first means, so as to evacuate air from, and prevent natural shrinkage of the live dough; means for driving said element from the conveying means and maintaining the teeth of the element out of contact with the conveying means to prevent damage to the latter by the teeth; and means for dividing the punctured dough sheet into sections as it is being conveyed by the first means.

2. A dough handling machine comprising means for conveying a sheet of dough along a predetermined path; a rotary puncturing element having peripheral series of teeth for puncturing the dough sheet as it is being fed by the first means, so as to evacuate air from, and prevent natural shrinkage of the live dough; said element having untoothed portions engaging the conveying means to maintain the teeth out of contact with the conveying means and to drive the element from the latter; and means for dividing the punctured dough sheet into sections as it is being conveyed by the first means.

3. A dough handling machine having a belt for conveying a sheet of dough; and a rotatably mounted roller having peripheral teeth for puncturing the dough sheet at intervals as it is being conveyed by the belt; the roller having enlarged portions in rolling contact with the belt to maintain the teeth out of contact with the belt and to drive the roller from the belt.

4. A dough handling machine having a pair of rotatably mounted rollers for shaping a body of dough into a sheet; an inclined chute for delivering dough to the rollers; a roller having teeth on its periphery; and means for rotatably mounting said roller to rest upon dough in the chute so as to retard movement of the dough sufficiently to prevent overfeeding of the dough to the pair of rollers.

5. A dough handling machine having a conveyor belt for feeding a sheet of dough stock; a rotary puncturing element having teeth for puncturing the sheet of dough stock as it is being fed by the belt; means for driving the puncturing element from the belt while maintaining the teeth of said element out of contact with the belt so as to prevent damage to the belt by the teeth; and means for driving the belt.

OSCAR D. SCRUGGS, Jr.